United States Patent [19]

Karapita

[11] Patent Number: 4,986,506

[45] Date of Patent: Jan. 22, 1991

[54] SUSPENSION ARM

[76] Inventor: Alex Karapita, 38 Robinter Dr., Willowdale, Ontario, Canada, M2M 3R2

[21] Appl. No.: 292,958

[22] Filed: Jan. 3, 1989

[30] Foreign Application Priority Data

Jan. 4, 1988 [GB] United Kingdom ............... 8800057

[51] Int. Cl.$^5$ .............................................. E04G 3/00
[52] U.S. Cl. .............................. 248/280.1; 248/123.1; 248/325
[58] Field of Search ............. 248/123.1, 281.1, 292.1, 248/364, 571, 572, 325, 280.1; 254/124; 414/719, 720, 735, 680, 699, 917; 74/49, 55

[56] References Cited

U.S. PATENT DOCUMENTS

| | | | |
|---|---|---|---|
| 999,220 | 8/1911 | Harmon | 74/49 X |
| 2,871,723 | 2/1959 | Shephard | 74/55 X |
| 3,154,029 | 10/1964 | Bronson | 211/59.3 X |
| 3,517,652 | 6/1970 | Albertson | 74/49 X |
| 4,684,088 | 8/1987 | Heller | 248/280.1 X |
| 4,728,247 | 3/1988 | Nakashima | 414/720 X |
| 4,736,922 | 4/1988 | Karapita | 248/325 |
| 4,768,918 | 9/1988 | Gorman | 414/719 |
| 4,812,104 | 3/1989 | Suzuki | 414/735 |

Primary Examiner—J. Franklin Foss
Attorney, Agent, or Firm—Shoemaker and Mattare, Ltd.

[57] ABSTRACT

"A counterbalancing device includes a base and a main arm pivotally mounted to the base. The main arm resists a force acting thereon at a location remote from the axis, by virtue of a crank arm fixed to the main arm and supporting a cam follower, the latter located such that a hypothetical line from the axis to the follower is perpendicular to the direction of the main arm. A carriage moves with respect to the base and has a cam wall against which the follower bears, and a constant force spring provision is made to urge the cam wall against the follower in a direction which places a torque on the main arm so as to counterbalance the force. In a variant, a main arm has two ends and is pivotally mounted at a location between its ends to the base. First and second auxiliary arms are mounted respectively to the ends of the main arm, and the device is constructed such that the angle between the auxiliary arm directions is maintained constant. A first substantially constant force acts upon the remote end of the first auxiliary arm, and a second substantially constant force acts at a remote end of the second auxiliary arm. The ratio of the distances from the pivot location of the main arm to its two respective ends is the same as the ratio of the lengths of the first and second auxiliary arms."

15 Claims, 17 Drawing Sheets

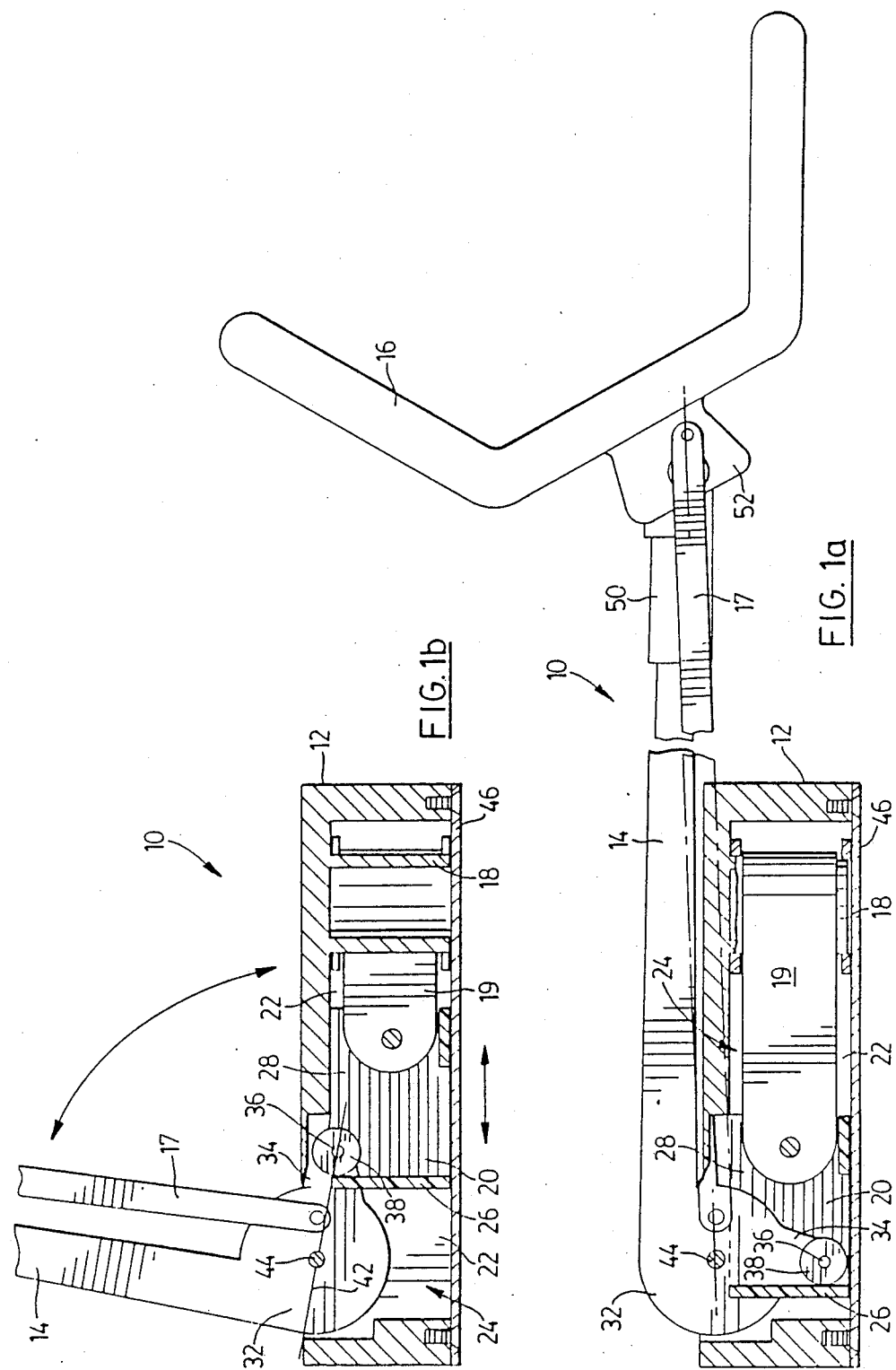

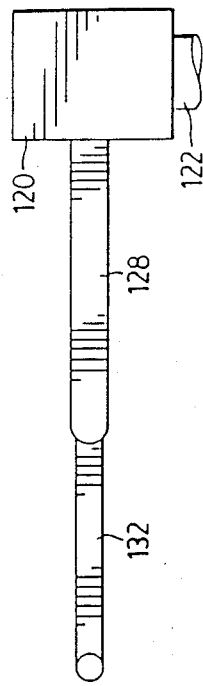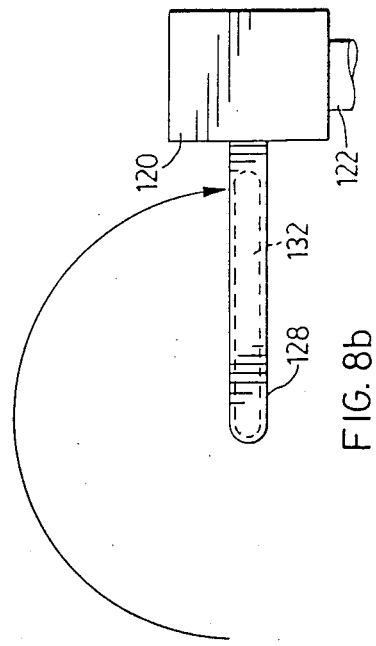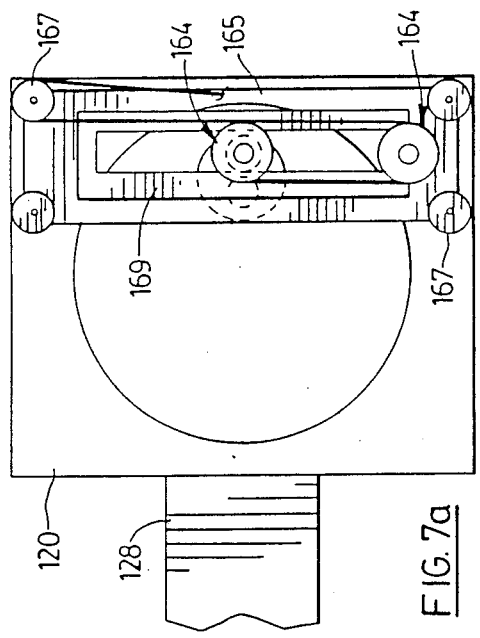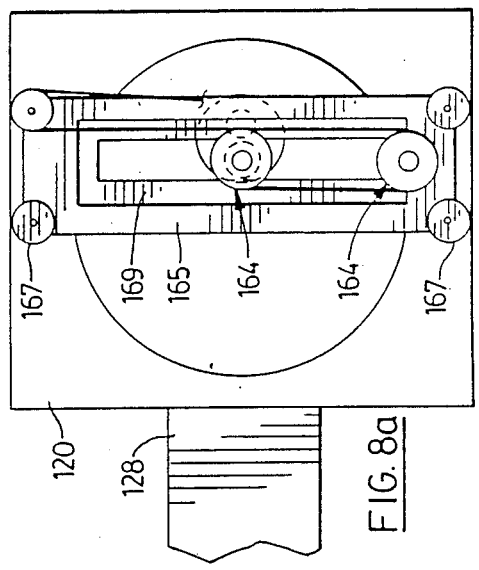

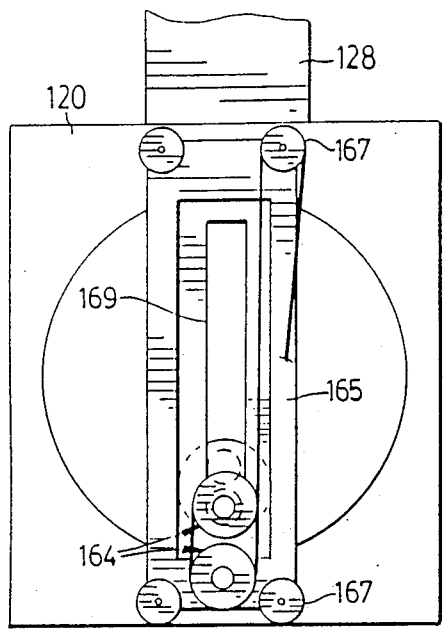
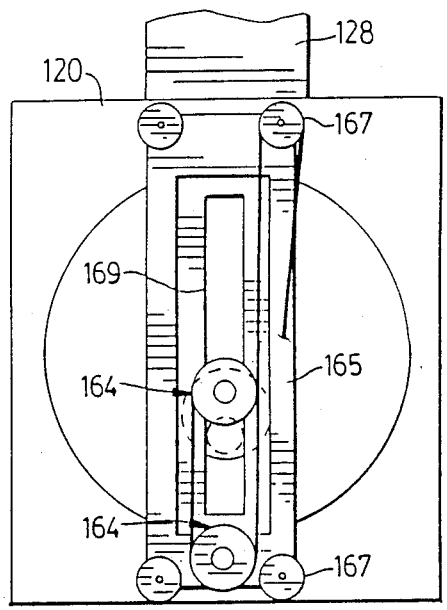
FIG. 9a　　　　　　　　FIG. 10a
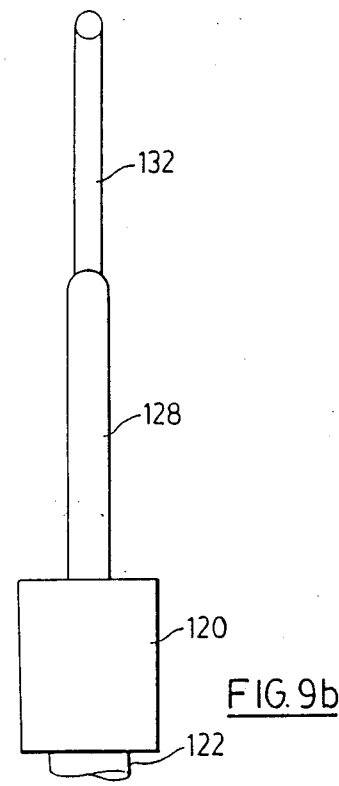
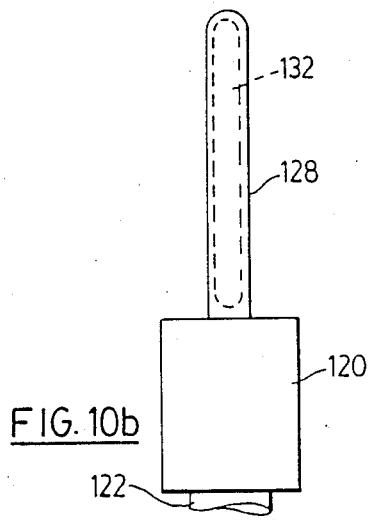
FIG. 9b　　　　　　　　FIG. 10b

SUSPENSION ARM

FIELD OF THE INVENTION

This invention relates to counterbalance devices having an arm for suspending articles and employing constant-force means to achieve the counterbalancing effect.

BACKGROUND OF INVENTION

Counterbalancing devices for suspending articles are well known. An example of such a device is shown in my U.S. Pat. No. 4,736,922 issued Apr. 12, 1988. In that patent I show an apparatus having a counterbalanced suspension arm which will move in an arc of about 90°. It is an object of the present invention to provide a counterbalanced suspension arm which will move in an arc of 360°. Another object of the invention is to provide a counterbalanced suspension arm which is operable independent of the gravitational field. A further object of the invention is to provide such a device having an articulating arm comprising one or more arm segments. The arm segments rotate in unison or independently while counterbalancing a suspended object.

SUMMARY OF THE INVENTION

Essentially the invention consists of a counterbalancing arm comprising one or more arm segments capable of 360° rotation about a pivot axis normal to the arm and forming a principal fulcrum, the counterbalancing being effected by duplication of the cosine of pivotal movement of each arm segment on one side of its fulcrum with a corresponding crank element on the opposite side of the princial fulcrum (primary pivot point), a constant force being applied (which may be enhanced) by a force multiplier arrangement) to crank element.

Preferably the invention is applied to counterbalancing an object of uniform weight in a gravitational field but may also be employed as a constant force "push or pull" mechanism independent of the gravitational field, i.e. in a non-vertical plane (eg. a clamping device).

More particularly, this invention provides, in combination, a base,
a main arm pivotally mounted to said base for swinging movement in a given plane about an axis, the main arm being adapted to resist a force acting thereon in said given plane at a location remote from said axis,
a crank arm fixed with respect to the main arm and supporting a cam follower, said cam follower being located such that a hypothetical line within said given plane extending from said axis to said follower is substantially perpendicular to the direction of said main arm,
a carriage mounted for movement with respect to said base within said given plane and defining a cam wall against which said follower bears,
and constant force spring means continuously urging said cam wall against said follower in a direction which places a torque on the main arm so as to counterbalance the said force.

Further, this invention provides, in combination:
a main arm having two ends and being pivotally mounted, at an intermediate location between its ends, to said base for swinging movement in a given plane about a first axis,
a first auxiliary arm having two ends and being pivotally mounted at one of its ends to one end of the main arm for swinging movement in said plane about a second axis, the other end of the first auxiliary arm having an attachment location, defined by a third axis, through which acts a first substantially constant force,
a second auxiliary arm having two ends and being pivotally mounted at one of its ends to the other end of the main arm for swinging movement in said plane about a fourth axis, the other ned of the second auxiliary arm defining a fifth axis through which a counterbalancing force can be directed,
the distance between the various axes being defined by the relation:

$$d1/d2 = D1/D2$$

where:
d1 is the distance between the first and fourth axes,
d2 is the distance between the fourth and fifth axes,
D1 is the distance between the first and second axes, and
D2 is the distance between the second and third axes;
means for ensuring the constancy of whatever angle exists between (1) a first plane containing the second and third axes and (2) a second plane containing the fourth and fifth axes, and
means for exerting, on the second auxiliary arm at the fifth axis, a second substantially constant force.

Finally, this invention provides, in combination:
a main arm having two ends, and being pivotally mounted, at an intermediate location between its ends, to said base for swinging movement in a given plane about a first axis,
a first auxiliary arm having two ends and being pivotally mounted at one of its ends to one end of the main arm for swinging movement in said plane about a second axis,
a second auxiliary arm having two ends and being pivotally mounted at one of its ends to the other end of the first auxiliary arm for swinging movement in said plane about a third axis, the other end of the second auxiliary arm having an attachment location, defined by a fourth axis, through which acts a first substantially constant force,
a third auxiliary arm having two ends and being pivotally mounted at one of its ends to the other end of the main arm for swinging movement in said plane about a fifth axis,
a fourth auxiliary arm having two ends and being pivotally mounted at one of its ends to the other end of the third auxiliary arm for swinging movement in said plane about a sixth axis, the other end of the fourth auxiliary arm defining a seventh axis through which a counterbalancing force is directed,
the distance between the various axes being defined by the relation:

$$d1/d2/d/3 = D1/D2/D3$$

where:
d1 is the distance between the first and fifth axes,
d2 is the distance between the fifth and sixth axes,
d3 is the distance between the sixth and seventh axes,
D1 is the distance between the first and second axes, D2 is the distance between the second and third axes, and D3 is the distance between the third and fourth axes;

means for (a) ensuring the constancy of whatever angle exists between (1) a plane containing the second and third axes and (2) a plane containing the fifth and sixth axes, and (b) ensuring the constancy of whatever angle exists between (1) a plane containing the third and fourth axes and (2) a plane containing the sixth and seventh axes, and means for exerting, on the fourth auxiliary arm at the seventh axis, a second substantially constant force.

BRIEF DESCRIPTION OF THE DRAWINGS

Example embodiments of the invention are shown in the accompanying drawings in which:

FIG. 1a is a vertical cross-sectional view of a device supported on a horizontal surface and having a counterbalanced arm in a horizontal position carrying a weight in the form of a mirror;

FIG. 1b is a view similar to FIG. 1 showing the arm elevated;

FIGS. 7a, 7b, 8a, 8b, 9a, 9b, 10a and 10b are simplified views in elevation of the crank and carriage arrangement of the device of FIGS. 3 to 6;

DESCRIPTION OF PREFERRED EMBODIMENTS

Figure 2A:
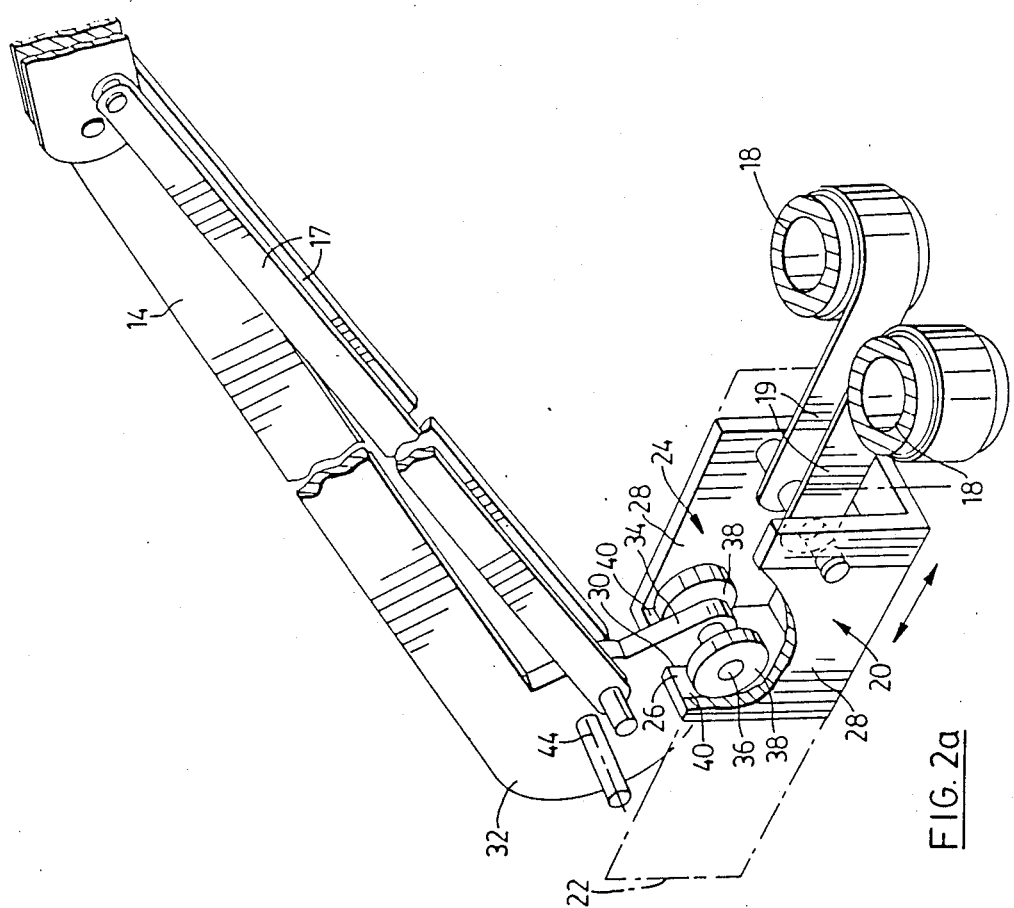
FIG. 2a is a perspective view of the essential elements of the device of FIG. 1.

The device of FIGS. 1 and 2 shows a desk-top counterbalancing unit 10 having a base 12, an arm 14, and a weight 16 on the end of arm 14. In this (the first) embodiment illustrated, weight 16 is a compound mirror of which the angular orientation is controlled by a quasi-parallelogram linkage which includes a link arm 17. Base 12 incorporates two integral spindles 18 arranged in side-by-side relation as seen in FIG. 2a. Around each spindle 18 is coiled a constant-force spring. Constant-force springs are well known in the art, one manufacturer thereof being Ametek. The characteristic of a constant-force spring of the kind contemplated for spindles 18 in FIG. 2a is that, as an end of the spring is pulled away from spindle 18, the spring unwinds by slipping with respect to the spindle, and seeks to pull the end back to spindle 18 with a force which is substantially the same regardless of how far the end has been pulled away from spindle 18.

As seen in FIG. 2a, the ends of both the constant-force springs on spindle 18 are pegged to a sliding block 20, which travels in vertical guideway partitions 22 defined integrally with base 12. Sliding block 20 is shaped to define an internal cavity or chamber 24 with a rear end wall 26, and two side walls 28. Rear wall 26 has a removed portion in the upper central region as seen at 30 in FIG. 2a.

Arm 14 seen in FIG. 1 and 2a is integral with a circular portion 32 from which extends an arm 34, the arm 34 projecting down into chamber 24 defined in sliding block 20. At the end of arm 34 is a pivot pin 36 which supports two follower wheels 38, one on either side of arm 34. The follower wheels bear rearwardly against rear wall 26, marginal portions 40 of which extend the full height of the wall.

Looking at FIG. 1b, it will be seen that a line 42 extending between a pivot axis of 44 of arm 14 and the axis of pin 36 is substantially at right angles to the main direction of arm 14. It will further be evident that weight 16 at the rightward end of arm 14 will seek to move arm 14 in a clockwise direction due to gravity, thus seeking to press follower wheels 38 leftwardly against rear wall 26 of sliding block 20. Sliding block 20, however, has a constant rightward force applied to it due to constant-force springs 19 on spindles 18; thus a restoring or counterbalance torque will be applied to the arm 14. Furthermore, it will be appreciated from a geometric point of view that the force exerted by the constant force springs can be selected such that mirror 16 (or other weight) at the end of arm 14 will always receive an exactly matching counterbalancing force, regardless of the angulation of the arm 14. More specifically, the torque moment exerted by weight 16 (of the mirror) about the pivot location 44 (including the weight of arm 14) can always be exactly matched by the counterbalancing torque exerted at the follower wheels 38 due to constant-force springs 19. It will be appreciated that the moment arm exerted by weight 16 urging the arm in the clockwise direction about pivot point 44 will decrease in proportion to the cosine of the angle made by arm 14 to a horizontal plane, such that, when arm 14 extends straight upwardly, the moment arm will be zero. By the same token, the restoring torque exerted on follower wheels 38, initially being the equivalent of the force of constant-force springs 19 times the distance between the pivot axes 36 and 44, will also decrease in proportion to the cosine of the angle made between arm 14 and a horizontal plane. This may be called the "cosine principle" as applied to the apparatus under consideration.

Figure 2B:
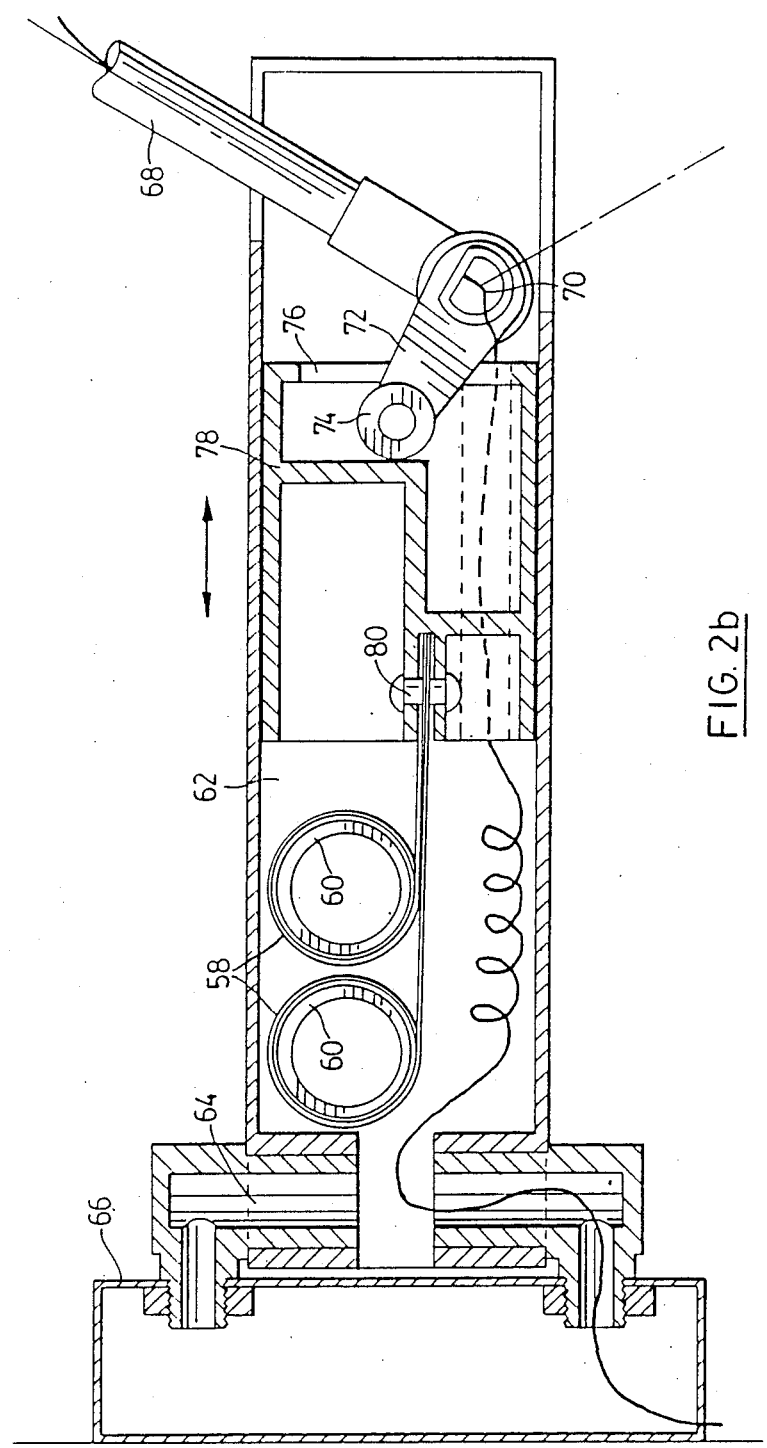
FIG. 2b is a vertical section of a device similar to FIG. 1 mounted on a vertical surface.

FIG. 2b a wall-mounted version of the device described with respect to FIG. 1. In the device of FIG. 2b two constant-force springs 58 are provided on spindles 60 which extend horizontally in this embodiment. Spindles 60 are integral with a base 62 which has a hinge connection at 64 to a mounting bracket 66 which is affixed to a vertical surface.

In this embodiment, an arm 68 is pivoted external to base 62 at a point 70 and has a further short arm 72 extending at right angles to the main extent of arm 68. Short arm 72 carries two follower wheels 74 at the end remote from arm 68, and follower wheels 74 bear against a wall 76 of a travelling block 78 within base 62. Constant-force springs 58 are pinned to block 78 by pin 80, and constantly seek to pull block 78 to the left with respect to the drawing. This results in a counterbalancing moment being applied about pivot point 70 through, short arm 72, which (including the weight of arms, 68 and 72) substantially exactly counteracts the moment caused by the weight (not seen in FIG. 2b) at the end of arm 68.

Figure 11:
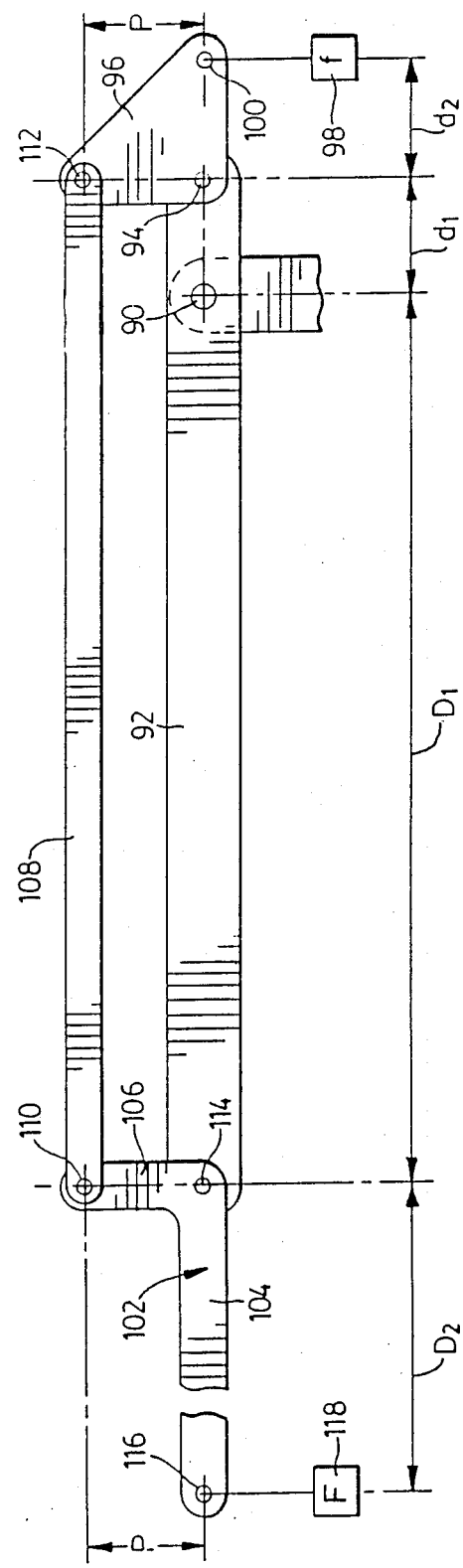

A second embodiment of the invention is shown in FIGS. 3 to 12 of the drawings. As seen in FIG. 11, a primary pivot point 90 supports a primary arm 92 for swinging motion in the vertical plane. Pivotally connected to the arm 92 at a pivot point 94 is a link 96 from which a weight 98 is suspended at a point 100. The distance between the points 94 and 100 is shown in FIG. 11 as $d_2$.

At the other end of arm 92 there is a L-shaped secondary arm 102 having a main portion 104 which is illustrated in line with the arm 92 in FIG. 11, and having a minor portion 106 extending at right angles to the portion 104. A link member 108 is connected between a pivot point 110 on the portion 106 and a pivot point 112 on the link 96. The L-shaped secondary arm 102 is pivoted to the arm 92 at 114. It will thus be appreciated that the pivot locations 110, 112, 94 and 114 are in a parallelogram regardless of the angulation of secondary arm 102 with respect to arm 92.

Secondary arm 102 has a connection point 136 from which a weight 118 is suspended. With the various components in the arrangement of FIG. 11, the distance between pivot points 114 and 116 is given as $D_2$, while the distance between pivot points 114 and 90 is given as $D_1$. The distance between pivot points 90 and 94 is given as $d_1$, and the distance $d_2$ has already been described.

In order to maintain a precise counterbalance between weights 118 and 98, the ratio between $D_2$ and $D_1$ must be the same as the ratio between $d_2$ and $d_1$. If this ratio takes place then perfect balance will ensue at all angulations of arms 92 and 102 provided weights 118 and 98 are in inverse proportion to the ratio: $D_1 + D_2/d_1 + d_2$.

These relationships will apply even when secondary arm 104 is rotated in counter-clockwise direction through 180°, thus placing weight 98 to the left of a vertical line through pivot point 94. According to arrangements seen in FIGS. 12a and 12b weight 118 is able to rotate through 360° about pivot point 90 as well as about pivot point 114.

Figure 3:
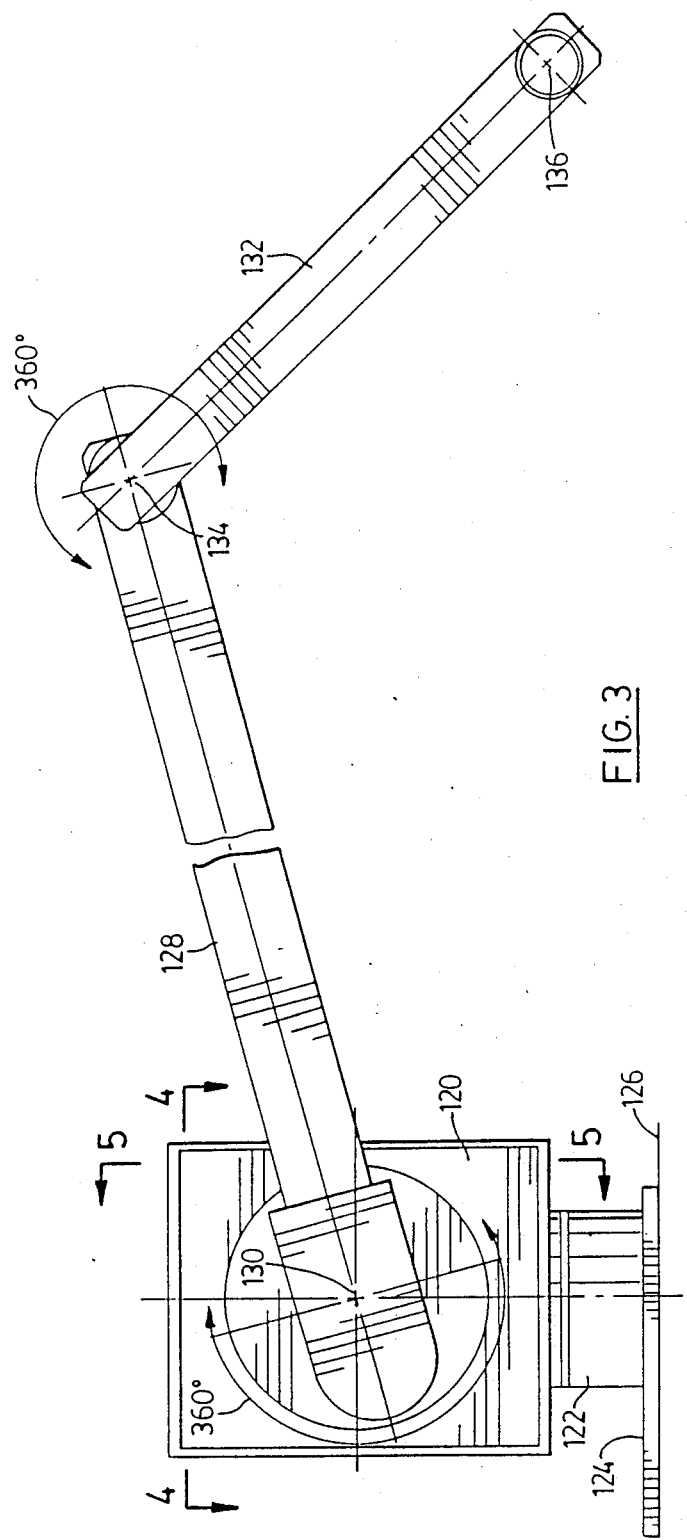
FIG. 3 is a vertical side view of a second embodiment of an apparatus having a counterbalanced articulated arm showing the rotational capabilities of the arm.

FIG. 12 illustrates the fact that there is a constant relationship between the distance from 90 to 100 (see FIG. 11) and the distance from 90 to 116, regardless of the angulation of the various members. The device of this embodiment, as seen in FIG. 3, comprises a main housing 120 supported on a pedestal 122 having a base 124 resting on a table top 126. An arm 128 is mounted for 360° travel about a pivot point 130, arm 128 being mounted to the side of main housing 120. A secondary arm 132 is mounted to arm 128 at a pivot point 134 for pivotal movement through 360°. A weight is adapted to be suspended at point 136, on the end of secondary arm 132 which is remote from primary arm 128.

Figure 4:
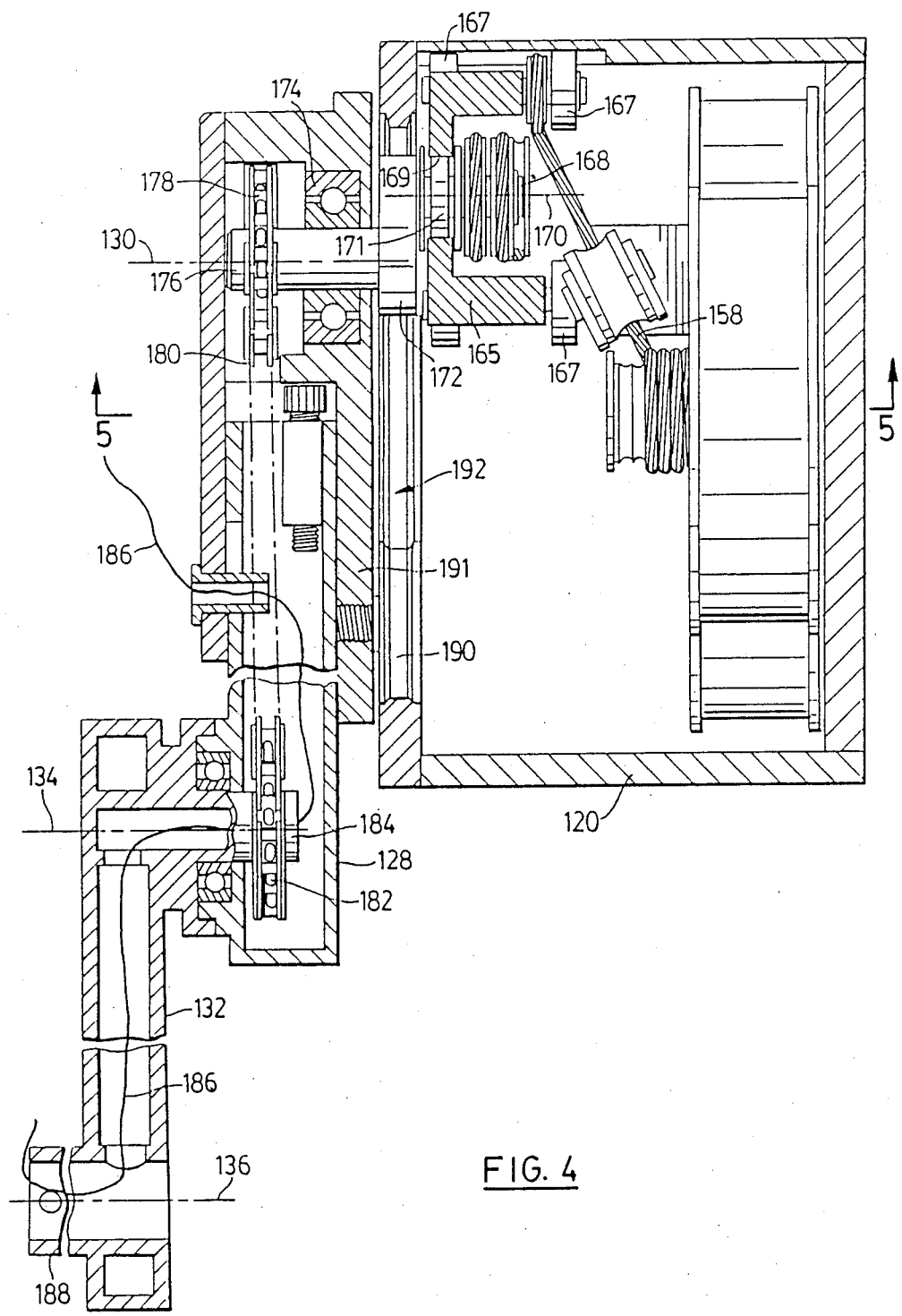
FIG. 4 is a horizontal cross-sectional view of the device taken along line 4—4 of FIG. 3.
Figure 5:
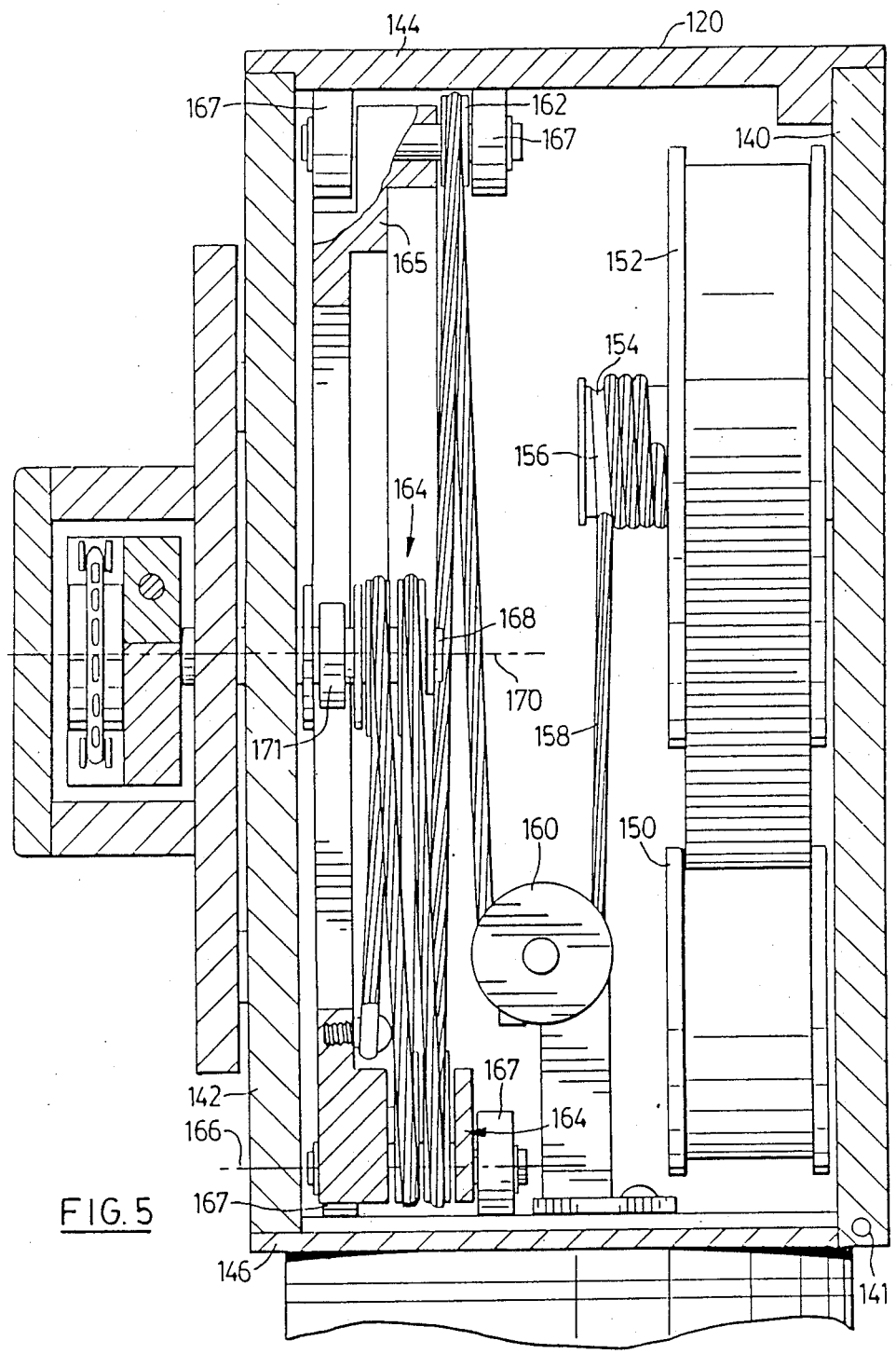
FIG. 5 is a view taken along line 5—5 of FIG. 4.
Figure 6:
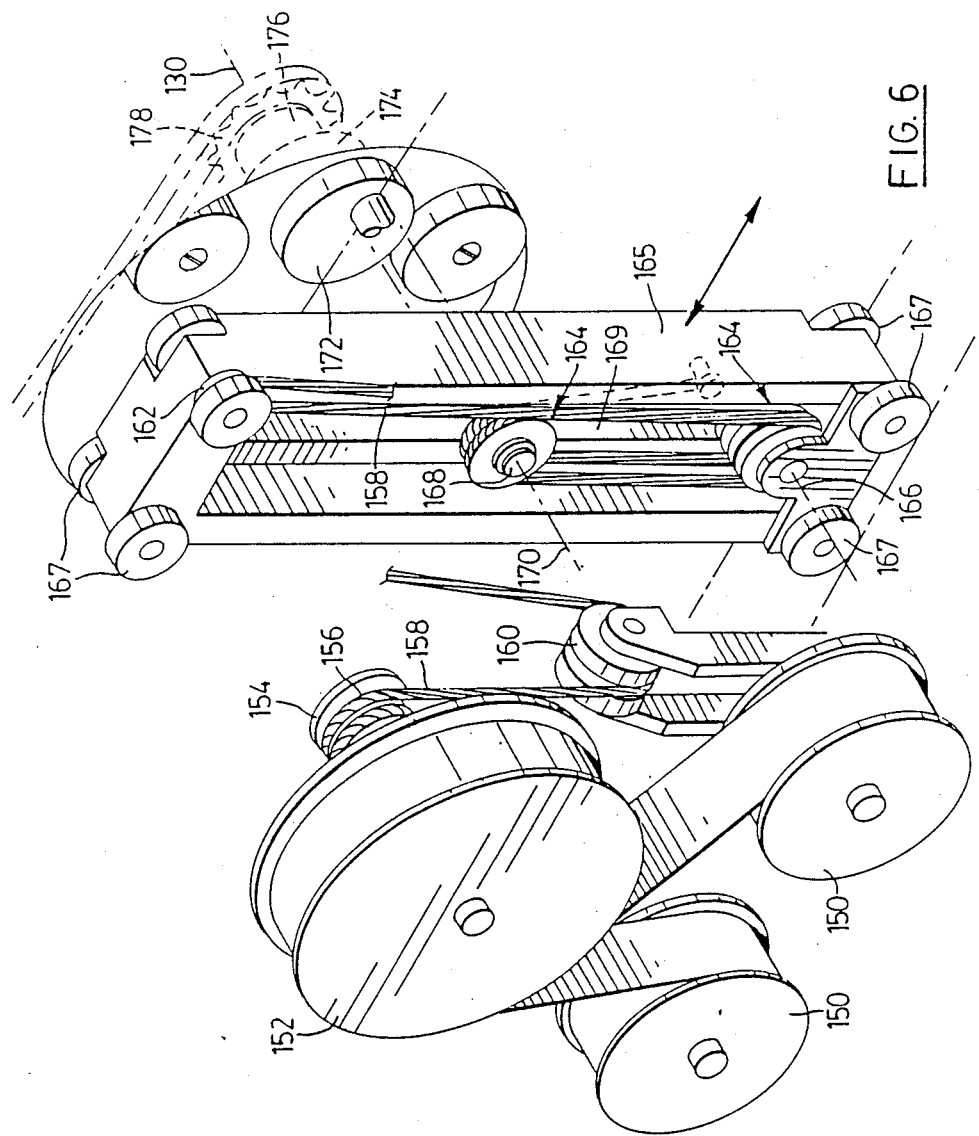
FIG. 6 is an exploded perspective view of the counterbalancing elements of the device of FIGS. 3 to 5.

As seen in FIGS. 4, 5 and 6 housing 120 includes a side wall 140 hinged at 141, a further side wall 142, a top wall 144, and a bottom wall 146. Mounted within the housing 120 is a spring take-up drum 152 and a pair of output drums 150, both drums being mounted for free rotation. Integral with drum 152 is a winch shaft 154, having a spiral groove 156 to receive the end of a cable 158. Cable 158 is entrained around an idler roller 160, and thence passes around a further idler roller 162. From roller 162 cable 158 enters a block-and-tackle arrangement 164 consisting of a plurality of rollers on each of two axles, the axles being spaced apart. One of the axles has an axis 166, and the other axle is shown at 168 with an axis 170.

Two constant force springs are entrained around take-up drum 152 and the output drums 150 in such a way as to exert a constant torque upon the take-up drum 152 regardless of the angular position of the latter. This in turn produces a constant force on cable 158, which is multiplied by block-and-tackle 164, thus exerting a constant and substantial force seeking to draw together the axes 166 and 170.

Block-and-tackle 164 and roller 162 are mounted on a sliding chassis or carriage 165, equipped with guide wheels 167, which is adapted to move horizontally (from left to right as seen in FIG. 6) to track the position of axle 168. Axle 168 is free to slide vertically up and down in slot 169 in carriage 165. Bearing 171 is located in slot 169.

Referring now to FIG. 4, axle 168 forming part of block-and-tackle 164 is supported on an arm 172, which is in turn pivoted through a ball bearing 174 about axis 130 (the axis about which the arm 128 is pivoted with respect to the housing 120). Mounted for rotation within ball bearing 174 is a main shaft 176 to which is keyed a sprocket 178 around which is entrained an endless chain 180. Endless chain 180 is likewise entrained about a sprocket 182 which is secured to a hollow shaft 184 at pivot point 134. Hollow shaft 184 is fixed with respect to secondary arm 132 and rotates therewith. An electrical wire 186 can be threaded through arms 128 and 132 in the manner shown, becoming available at the end of a sleeve 188 at the rightward end of secondary arm 13 (rightward with reference to FIG. 3).

It will thus be appreciated that block-and-tackle 164 seen in FIG. 5, along with the constant-force springs acting on cable 158, seeks always to pull shaft 168 downwardly with a constant force. Arm 72 is arranged in such a way that the direction between axes 170 and 130 is substantially the same as the main extent of primary arm 128. Thus as arm 128 is lifted upwardly, arm 172 swings downwardly about the axis 130. Because shaft 168 is pulled downwardly with a constant force, just as if a very large weight were hung on shaft 168, it will be understood that a perfect counterbalancing of a weight acting at axis 136 can be effected, provided the tension of cable 158 were selected appropriately. Furthermore, the counterbalancing continues to be precise even where primary arm 128 is maintained in one position, for example horizontal, and secondary arm 132 is pivoted. Due to endless chain 180, the pivoting of secondary arm 132 alone will cause equivalent pivoting of arm 172, thus maintaining the cosine relationship described earlier. In fact, the arrangement shown in FIGS. 3-6 is the exact mechanical equivalent of the idealized schematic arrangement shown in FIGS. 11, 12a and 12b.

A third embodiment of the invention, shown in 13 to 16 of the drawings, consists of a primary arm 128 with a primary pivot point 130, and a secondary arm 132 with a secondary pivot point 134 and a suspension point 136, as in the embodiment shown in FIG. 3. In this embodiment chain 180 of FIG. 4 is replaced by a row or train 200 of intermeshing gears 202 journally mounted in arm 128. A shaft 204 fixed to arm 132 at pivot point 134 carries a gear 206 which is at one end of row 200. Gear 208 at the other end of row 200 is fixed to a sleeve 210 journally mounted in bearings 212 and axially rotatable on a shaft 214 fixed on arm 128. The end of sleeve 210 projecting into housing 120 carries a first gear 216 which meshes with a crank gear 218 keyed on a crank shaft 220 which carries a crank arm 222. The other end of crank arm 222 carries a follower 224 which moves freely in a vertical slot 226 of a carriage 228. A first primary gear 230 is fixed on shaft 214 in housing 120. Crank shaft 220 is mounted on primary gear 230 offset from shaft 214 and freely rotatable axially on primary gear 230.

A second primary gear 232 journally mounted on housing 120 by a shaft 233 meshes with first primary gear 130. A vertical row of intermeshing gears 234, journally mounted in a column 236 fixed on the inside of housing 120, interconnects gear 216 with a like gear 238 on shaft 233 of second primary gear 232, which meshes with a crank gear 240 keyed on a crank shaft 242 which carries a crank arm 244. The other end of crank arm 214 carries a follower 246 which moves freely in slot 226 of carriage 228.

Carriage 228 is mounted on a pair of journalled guide wheels 248 which travel along opposed parallel walls 250 of housing 120. A constant-force spring arrangement 252 is journally mounted on carriage 228 and consists of two spring drums 254 and a take-up drum 256. A winch shaft 258 is integral with take-up drum 256 and a block and tackle arrangement 260 is mounted on shafts 214 and 233 of primary gears 230 and 232 and consists of a plurality of idler pulleys 262. A cable 264 anchored at one end 266 on carriage 228 passes over idler pulleys 262 and around winch shaft 258 with the other end 268 of the cable being anchored on take-up drum 256.

In the operation of the embodiment of FIGS. 13 to 16 the rotation of secondary arm 132 about pivot point 134 is passed through gear train 202 and sleeve 210 to gear 216 which causes crank arms 222 and 240 to rotate and moves carriage 228, the travel of the carriage being directed by rotation of primary gears 230 and 232. The block and tackle pulley 260 and 262 move vertically providing a constant force by a constant-force spring arrangement 254.

Figure 17:
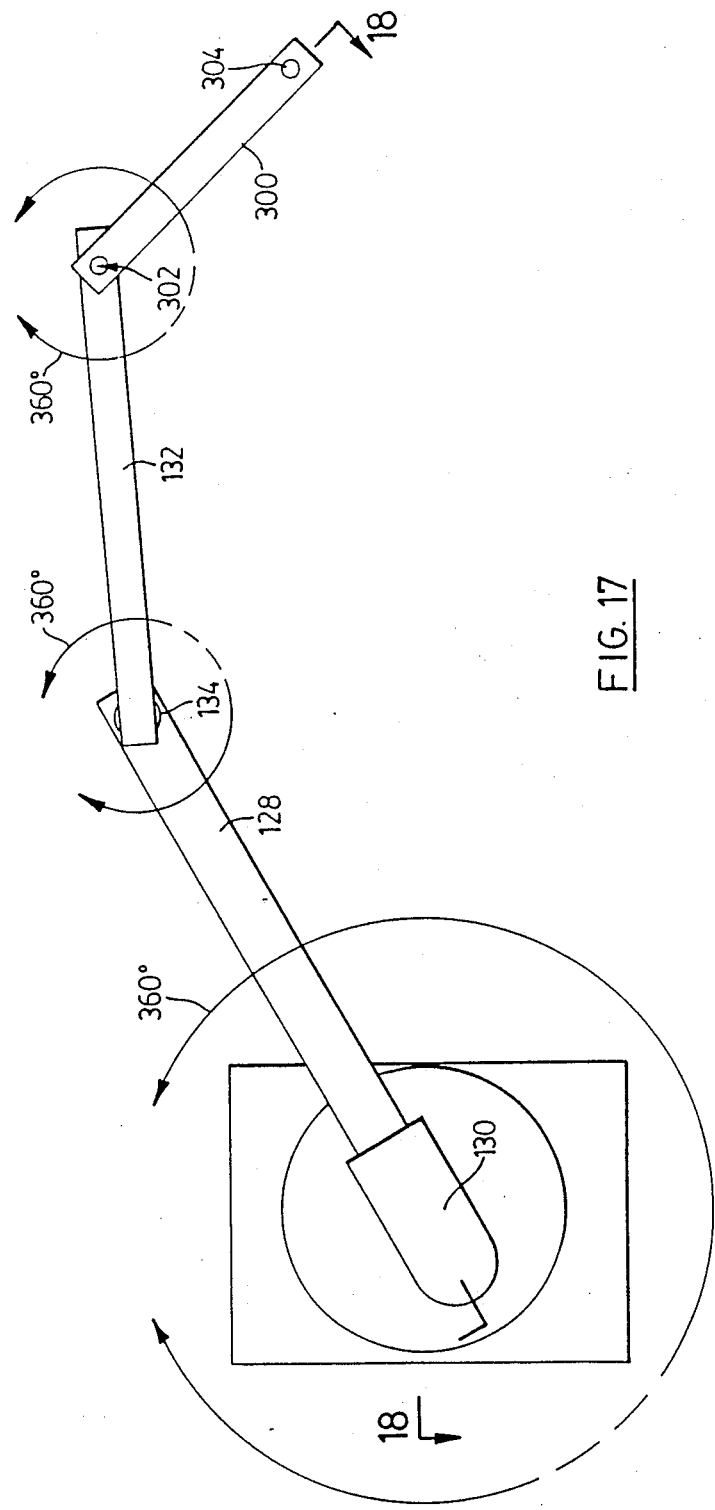
FIG. 17 is a representational side view similar to FIGS. 3b and 13 of a fourth embodiment of the invention.
Figure 18:
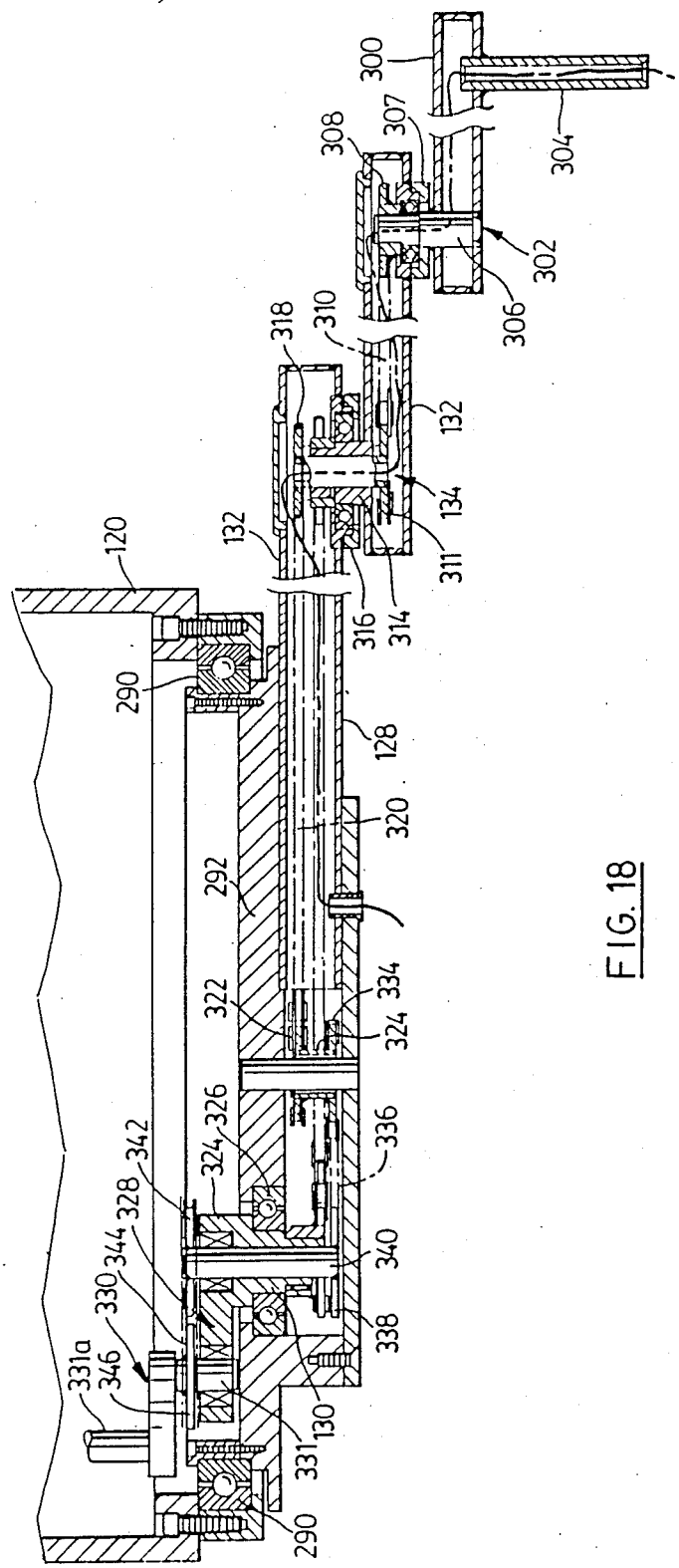
FIG. 18 is a cross-sectional view taken along line 18—18 of FIG. 17.

A fourth embodiment shown in FIGS. 17 and 18 of the drawings has a primary arm 128 with a primary pivot point 130 which is central to a circumferential bearing 290 carrying a circular plate 292 of housing 120 which performs the same function as the three wheels in the second embodiment. (As seen in FIG. 4, three equally spaced wheels 190 are journally mounted on housing plate 191 and roll within a circumferential cavity 192 in the sidewall of housing 120). The fourth embodiment also has a secondary arm 132 with a secondary pivot point 134, as in the embodiment shown in FIG. 3, and a tertiary arm 300 with a tertiary pivot point 302 and a suspension point 304. The structure and mechanism of primary arm 128 and secondary arm 132 are similar to those in the second embodiment of FIGS. 3 to 12. Pivot point 302 of tertiary arm 300 consists of a pin 306 fixed to arm 300, journalled in secondary arm 132 on bearings 307 and carrying a chain sprocket 308 within arm 132. Sprocket 308 is connected by a chain 310 to a sprocket 311 fixed on a sleeve 314 which is journally mounted on bearings 316 on arm 128 and carries a chain sprocket 318 in arm 128. Sprocket 318 is connected by a chain 320 to a sprocket 322 which is fixed to a sleeve 324. Also fixed to sleeve 324 is a sprocket 334 which drives a chain 336 and a sprocket 338 fixed to one end of an axle 340 journally mounted in a sheath 324. Fixed to the other end of axle 340 is a sprocket 342 which drives a chain 344 and a sprocket 346 mounted on an axle 331 which is integral with a crank 330. An axle 331a on crank 330 carries block and tackle 164 seen in FIG. 5.

In the operation of the fourth embodiment arm 300 rotates axle 302, sprocket 308, chain 310, sprocket 311, axle 314, sprocket 318, chain 322, sprocket 333, sheath 332, sprocket 334, chain 336, sprocket 338, axle 340, chain 344, sprocket 346, axle 331, crank 330 and axle 331a. The arrangement of rotation of secondary arm 132 is as described in the second embodiment of FIGS. 3 to 12.

Figure 12A:
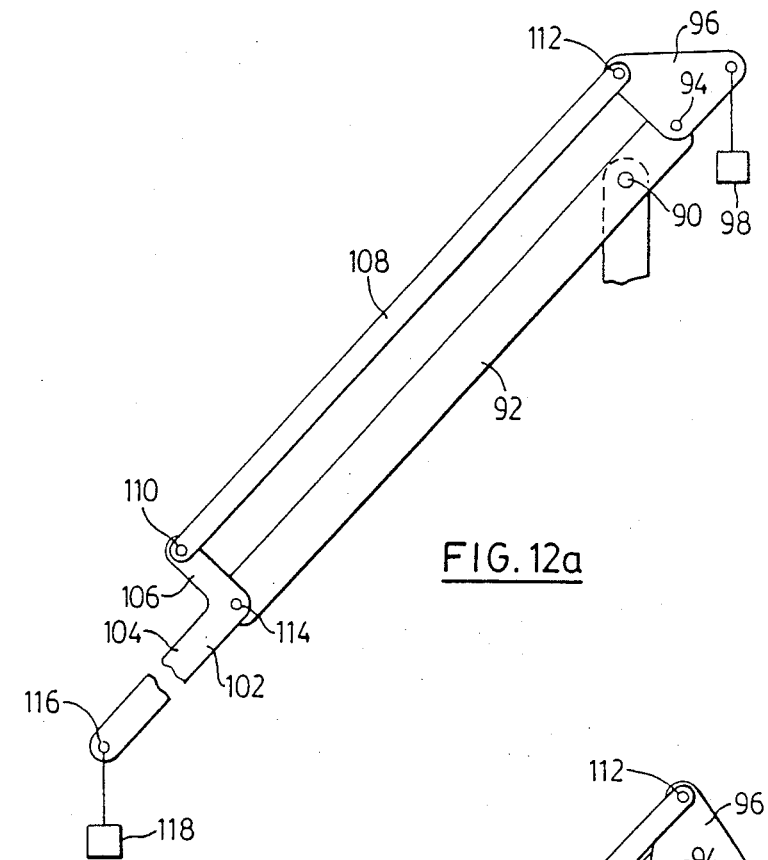
FIGS. 12a and 12b are schematic diagrams showing the principle of operation of the device of FIGS. 3 to 6.
Figure 12B:
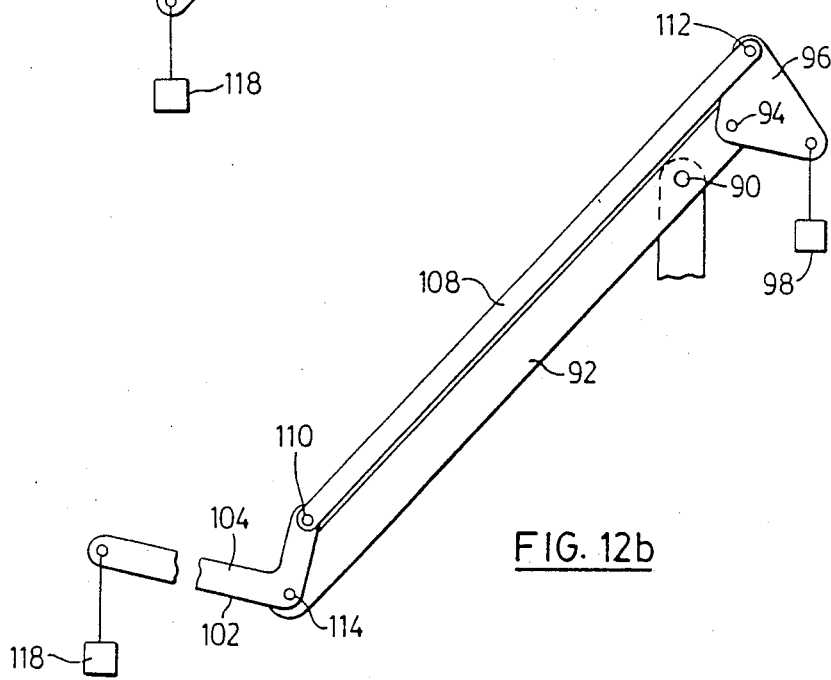
Figure 13:
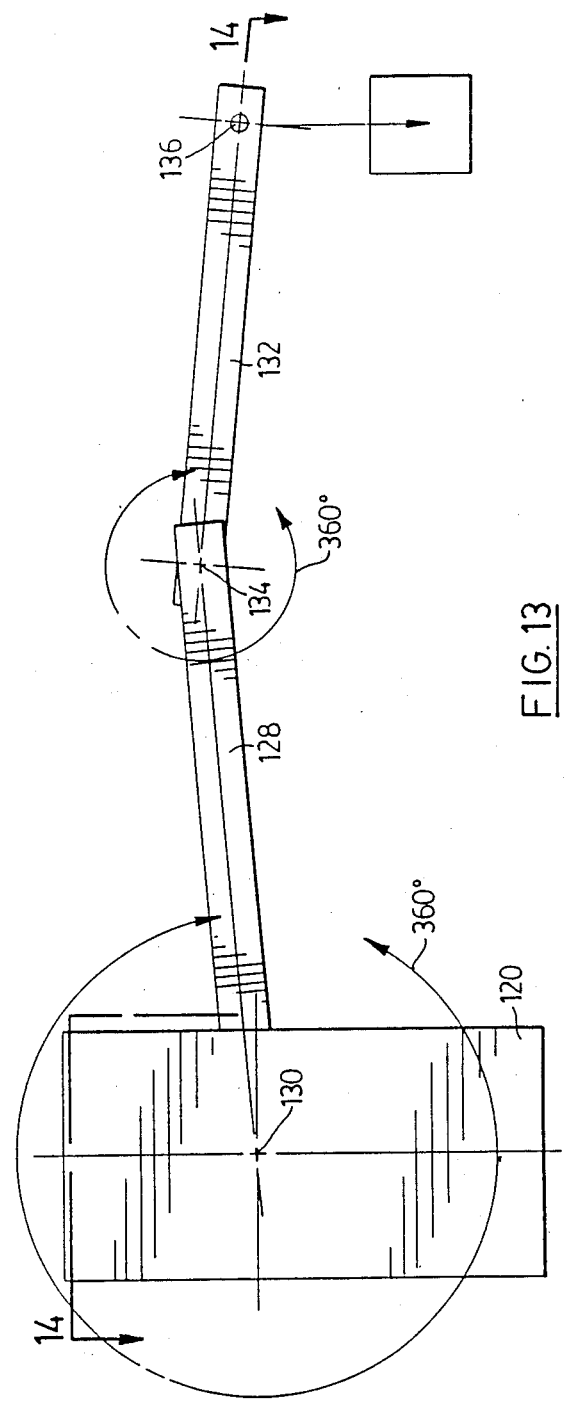
FIG. 13 is a view similar to FIG. 3 showing the rotational capabilities of a third embodiment consisting of a counterbalanced arm having two arm segments.
Figure 14:
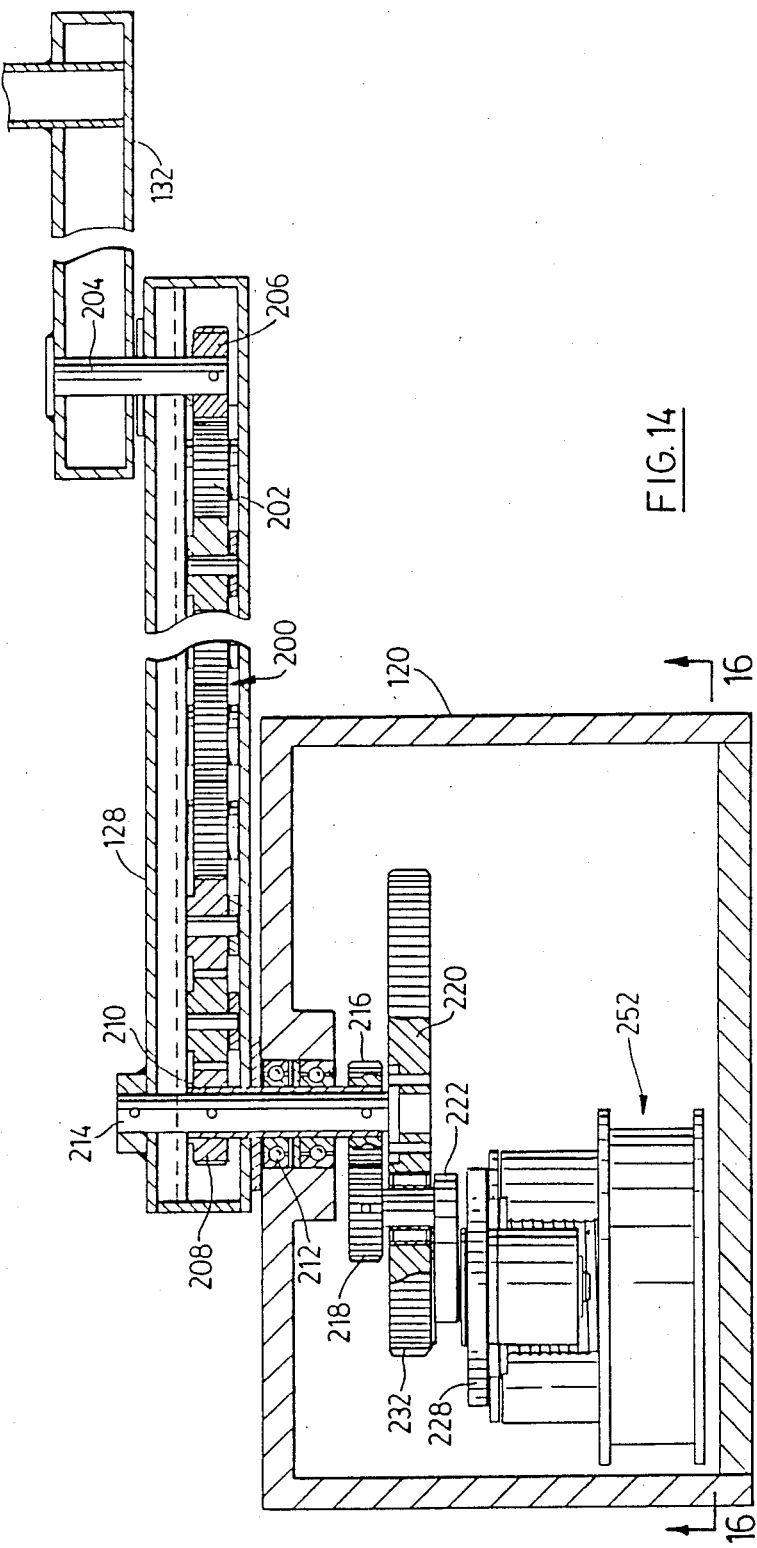
FIG. 14 is a horizontal cross-sectional view taken along line 14—14 of FIG. 9.
Figure 15:
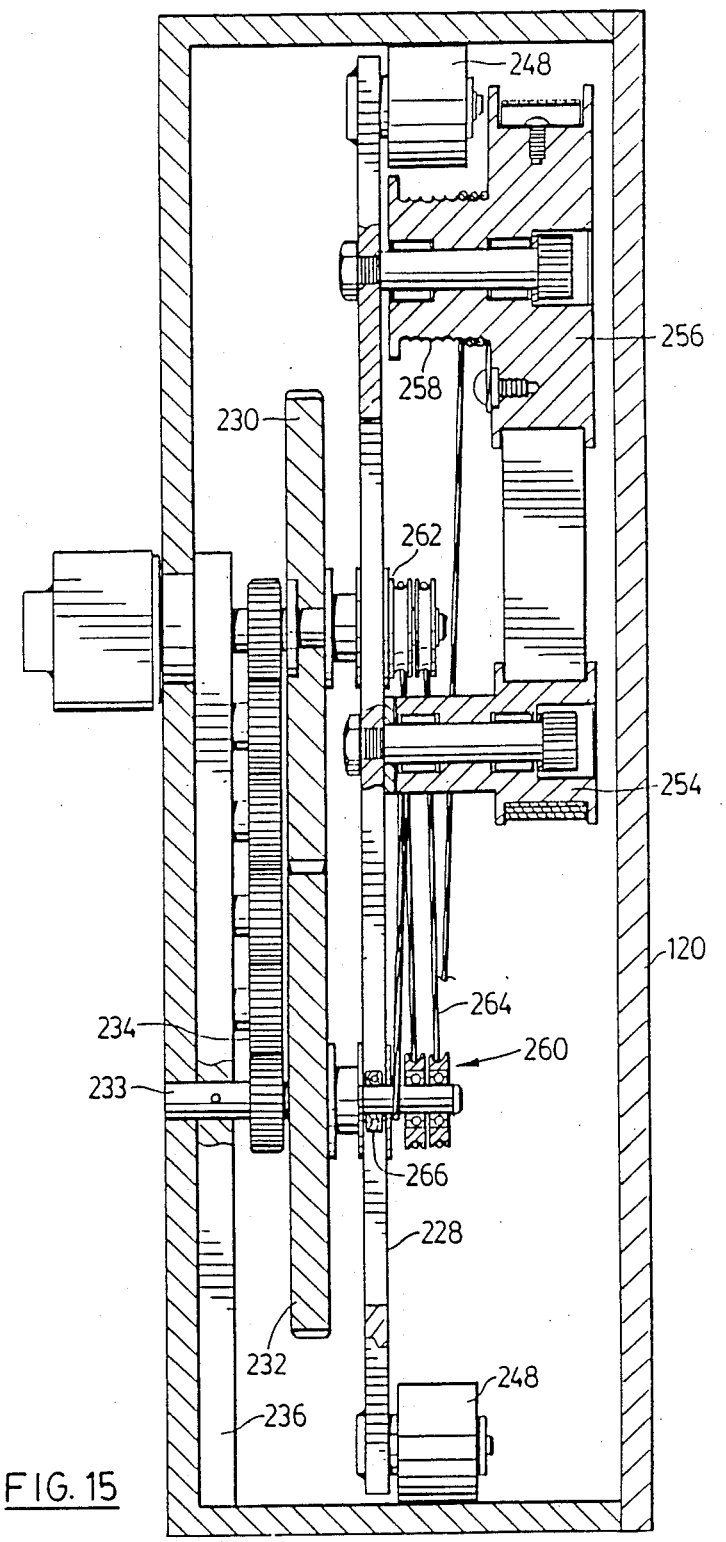
FIG. 15 is a cross-sectional view taken along line 15—15 of FIG. 14.

Referring to FIG. 4, it will be appreciated by those skilled in the art that if 360° rotation of the second arm segment is not required the sprocket-chain arrangement can be replaced with a parallelogram means described in FIGS. 11, 12a and 12b.

Figure 16:
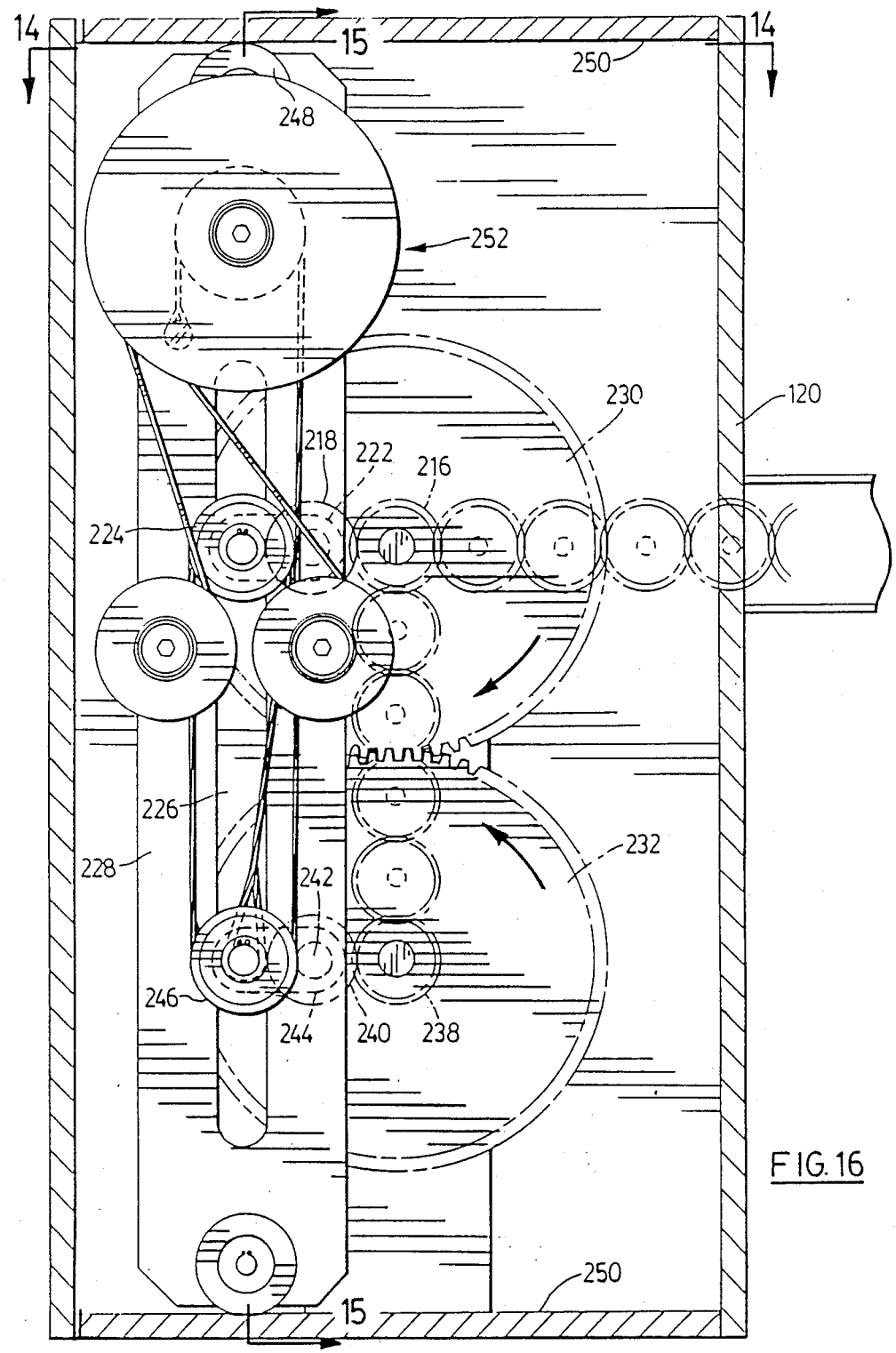
FIG. 16 is a view taken along line 16—16 of FIG. 14.

Referring to FIG. 16, it will be appreciated that prime gears 230 and 232 together with block and tackle arrangement 260 and primary arm 128 comprise counterbalance means as an alternate to the second embodiment.

I claim:

1. In combination:

a base a main arm pivotally mounted to said base for swinging movement in a given plane about an axis, the main arm being adapted to resist a force acting thereon in said given plane at a location remote from said axis, a crank arm fixed with respect to the main arm and supporting a cam follower, said cam follower being located such that a hypothetical line within said given plane extending from said axis to said follower is substantially perpendicular to the direction of said main arm, a carriage mounted for movement with respect to said base within said given plane and defining a cam wall against which said follower bears, and constant force spring means continuously urging said cam wall against said follower in a direction which places a torque on the main arm so as to counterbalance the said force.

2. The combination claimed in claim 1, in which said given plane is vertical, said first force is the result of a weight suspended on said main arm, said carriage moves in a substantially horizontal direction, and said cam wall is substantially upright.

3. In combination:

a main arm having two ends and being pivotally mounted, at an intermediate location between its ends, to said base for swinging movement in a given plane about a first axis, a first auxiliary arm having two ends and being pivotally mounted at one of its end to one end of the main arm for swinging movement in said plane about a second axis, the other end of the first auxiliary arm having an attachment location, defined by a third axis, through which acts a first substantially constant force, a second auxiliary arm having two ends and being pivotally mounted at one of its ends to the other end of the main arm for swinging movement in said plane about a fourth axis, the other end of the second auxiliary arm defining a fifth axis through which a counterbalancing force can be directed, the distance between the various axes being defined by the relation:

$$d1/d2 = D1/D2$$

where:
- d1 is the distance between the first and fourth axes,
- d2 is the distance between the fourth and fifth axes,
- D1 is the distance between the first and second axes, and
- D2 is the distance between the second and third axes;

means for ensuring the constancy of whatever angle exists between (1) a first plane containing the second and third axes and (2) a second plane containing the fourth and fifth axes, and means for exerting, on the second auxiliary arm at the fifth axis, a second substantially constant force.

4. The combination claimed in claim 3, in which the said given plane is a vertical plane, in which the angle between said first and second planes is zero, in which said force is the effect of a weight suspended at said third axis, and in which the said substantially constant force is exerted in the vertical direction.

5. The combination claimed in claim 3, in which said means for exerting a substantially constant force comprises at least one constant force spring.

6. The combination claimed in claim 4, in which said means for exerting a substantially constant force comprises at least one constant force spring.

7. The combination claimed in claim 3, in which said means for ensuring the constancy of the angle includes a parallelogram linkage of which said main arm constitutes one side.

8. The combination claimed in claim 3, in which said means for ensuring the constancy of the angle includes an endless chain mounted on the main arm and entrained around sprockets.

9. The combination claimed in claim 3, in which said means for ensuring the constancy of the angle includes a plurality of gears mounted on the main arm and engaging each other in sequence.

10. In combination:
a main arm having two ends, and being pivotally mounted, at an intermediate location between its ends, to said base for swinging movement in a given plane about a first axis, a first auxiliary arm having two ends and being pivotally mounted at one of its ends to one end of the main arm for swinging movement in said plane about a second axis, a second auxiliary arm having two ends and being pivotally mounted at one of its ends to the other end of the first auxiliary arm for swinging movement in said plane about a third axis, the other end of the second auxiliary arm having an attachment location, defined by a fourth axis, through which acts a first substantially constant force, a third auxiliary arm having two ends and being pivotally mounted at one of its ends to the other end of the main arm for swinging movement in said plane about a fifth axis, a fourth auxiliary arm having two ends and being pivotally mounted at one of its ends to the other end of the third auxiliary arm for swinging movement in said plane about a sixth axis, the other end of the fourth auxiliary arm defining a seventh axis through which a counterbalancing force is directed, the distance between the various axes being defined by the relation:

$$d1/d2/d3 = D1/D2/D3$$

where:
- d1 is the distance between the first and fifth axes,
- d2 is the distance between the fifth and sixth axes,
- d3 is the distance between the sixth and seventh axes,
- D1 is the distance between the first and second axes,
- D2 is the distance between the second and third axes, and
- D3 is the distance between the third and fourth axes, means for (a) ensuring the constancy of whatever angle exists between (1) a plane containing the second and third axes and (2) a plane containing the fifth and sixth axes, and (b) ensuring the constancy of whatever angle exists between (1) a plane containing the third and fourth axes and (2) a plane containing the sixth and seventh axes, and means for exerting, on the fourth auxiliary arm at the seventh axis, a second substantially constant force.

11. The combination claimed in claim 10, in which said given plane is a vertical plane, in which said first substantially constant force is the effect of a weight suspended at said fourth axis, in which the plane containing the second and third axes is always parallel to the plane containing the fifth and sixth axes, in which the plane containing the third and fourth is always parallel to the plane containing the sixth and seventh axes, and in which said second substantially constant force is exerted downwardly in the vertical direction.

12. The combination claimed in claim 10, in which said means for exerting a second substantially constant force comprises at least one constant force spring.

13. The combination claimed in claim 11, in which said means for exerting a second substantially constant force comprises at least one constant force spring.

14. The combination claimed in claim 10, in which said means for ensuring the constancy of the angles includes endless chains mounted on the main arm, the first auxiliary arm and the third auxiliary arm, said chains being entrained around sprockets.

15. The combination claimed in claim 10, in which said means for ensuring the constancy of the angles includes a first plurality of gears mounted on the main arm and engaging each other in sequence, a second plurality of gears mounted on the first auxiliary arm and engaging each other in sequence, and a third plurality of gears mounted on the third auxiliary arm and engaging each other in sequence.

* * * * *